US011448321B2

(12) United States Patent
Kustermans et al.

(10) Patent No.: US 11,448,321 B2
(45) Date of Patent: Sep. 20, 2022

(54) BALL VALVE SEAL

(71) Applicant: SAINT-GOBAIN PERFORMANCE PLASTICS CORPORATION, Solon, OH (US)

(72) Inventors: Jan Kustermans, Brecht (BE); Benny Proost, Kontich (BE); Gabriele Tittonel, Lier (BE); Herman M. Dubois, Duffel (BE); Philippe Burlot, Kontich (BE); Andrea Maffezzoli, Agrate Brianza (IT); Shabarish Nunna, Kontich (BE); Andreas Vanvaerenbergh, Kontich (BE); Filip Rousseau, Niel (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 344 days.

(21) Appl. No.: 16/527,394

(22) Filed: Jul. 31, 2019

(65) Prior Publication Data
US 2020/0041002 A1 Feb. 6, 2020

Related U.S. Application Data

(60) Provisional application No. 62/714,315, filed on Aug. 3, 2018.

(51) Int. Cl.
*F16J 15/3284* (2016.01)
*F16K 5/06* (2006.01)

(52) U.S. Cl.
CPC ......... *F16J 15/3284* (2013.01); *F16K 5/0673* (2013.01)

(58) Field of Classification Search
CPC .............................. F16J 15/3284; F16J 15/54
See application file for complete search history.

(56) References Cited

U.S. PATENT DOCUMENTS

| 3,097,823 | A | * | 7/1963 | Kaiser | F16K 5/0678 251/172 |
| 5,992,856 | A | * | 11/1999 | Balsells | F16J 15/3236 277/553 |
| 6,254,275 | B1 | * | 7/2001 | Slaughter, Jr. | E21B 10/25 175/369 |
| 8,123,229 | B2 | | 2/2012 | Eguchi | |

(Continued)

FOREIGN PATENT DOCUMENTS

CN 102748497 A 10/2012
CN 103742672 A 4/2014
(Continued)

OTHER PUBLICATIONS

International Search Report and Written Opinion for PCT/US2019/044295, dated Nov. 14, 2019, 11 pages.

*Primary Examiner* — Gilbert Y Lee
(74) *Attorney, Agent, or Firm* — Abel Schillinger, LLP; David G Miranda

(57) ABSTRACT

A seal for a ball valve comprising a resilient ring defining an engagement feature; a first polymer ring disposed adjacent to a first axial end of the resilient ring and coupled with the engagement feature; and a second polymer ring disposed adjacent to a second axial end of the resilient ring and coupled with the engagement feature.

16 Claims, 3 Drawing Sheets

(56) References Cited

U.S. PATENT DOCUMENTS

| | | | | |
|---|---|---|---|---|
| 8,328,202 | B2* | 12/2012 | Foster | F16J 15/3236 277/572 |
| 8,544,850 | B2* | 10/2013 | Balsells | F16J 15/3212 277/551 |
| 8,684,362 | B2* | 4/2014 | Balsells | F16J 15/3212 277/353 |
| 9,234,591 | B2* | 1/2016 | Dilmaghanian | F16J 15/166 |
| 9,915,359 | B2 | 3/2018 | Ricard et al. | |
| 10,184,564 | B2* | 1/2019 | Balsells | F16J 15/3268 |
| 10,520,092 | B2* | 12/2019 | Dilmaghanian | F16J 15/3236 |
| 2002/0153664 | A1* | 10/2002 | Schroeder | F16J 15/002 277/551 |
| 2009/0146379 | A1* | 6/2009 | Foster | F16J 15/3236 277/307 |
| 2009/0289418 | A1* | 11/2009 | Cook | F16J 15/20 277/309 |
| 2010/0237565 | A1* | 9/2010 | Foster | F16J 15/3236 277/377 |
| 2011/0140369 | A1* | 6/2011 | Lenhert | F16J 15/322 277/589 |
| 2011/0147635 | A1 | 6/2011 | Seveso et al. | |
| 2014/0265139 | A1* | 9/2014 | Dilmaghanian | F16J 15/324 277/309 |
| 2016/0068728 | A1* | 3/2016 | Akulichev | C09K 3/1025 524/406 |
| 2016/0223086 | A1* | 8/2016 | Balsells | F16J 15/3268 |

FOREIGN PATENT DOCUMENTS

| | | |
|---|---|---|
| CN | 203703226 U | 7/2014 |
| CN | 104089044 A | 10/2014 |
| CN | 204420171 U | 6/2015 |
| CN | 105782484 A | 7/2016 |
| CN | 207178760 U | 4/2018 |
| JP | S5773458 U | 5/1982 |
| JP | S6219420 A | 1/1987 |
| JP | H11159637 A | 6/1999 |
| JP | 2007155073 A | 6/2007 |
| KR | 101527569 B1 | 6/2015 |
| WO | 2017141221 A1 | 8/2017 |

* cited by examiner

BALL VALVE SEAL

CROSS-REFERENCE TO RELATED APPLICATION(S)

This application claims priority under 35 U.S.C. § 119(e) to U.S. Patent Application No. 62/714,315 entitled "BALL VALVE SEAL," by Jan KUSTERMANS et al., filed Aug. 3, 2018, which is assigned to the current assignee hereof and incorporated herein by reference in its entirety.

FIELD OF THE DISCLOSURE

The present disclosure relates to seals, and more particularly to ball valve seals.

RELATED ART

Ball valves typically require the use of seat seals to preserve effective valve integrity when pressurized. Single piston effect seat seals operate unidirectionally while double piston effect seals operate bidirectionally.

Ball valves are used in a wide variety of industries including transportation, transmission and storage of fluids, gas processing, and industrial manufacturing. Industries utilizing ball valves continue to demand improvements in seat seal performance, particularly when operating in extreme environmental conditions like cryogenic temperatures, such as below −150° C.

BRIEF DESCRIPTION OF THE DRAWINGS

Embodiments are illustrated by way of example and are not intended to be limited in the accompanying figures.

DETAILED DESCRIPTION

Figure 1:
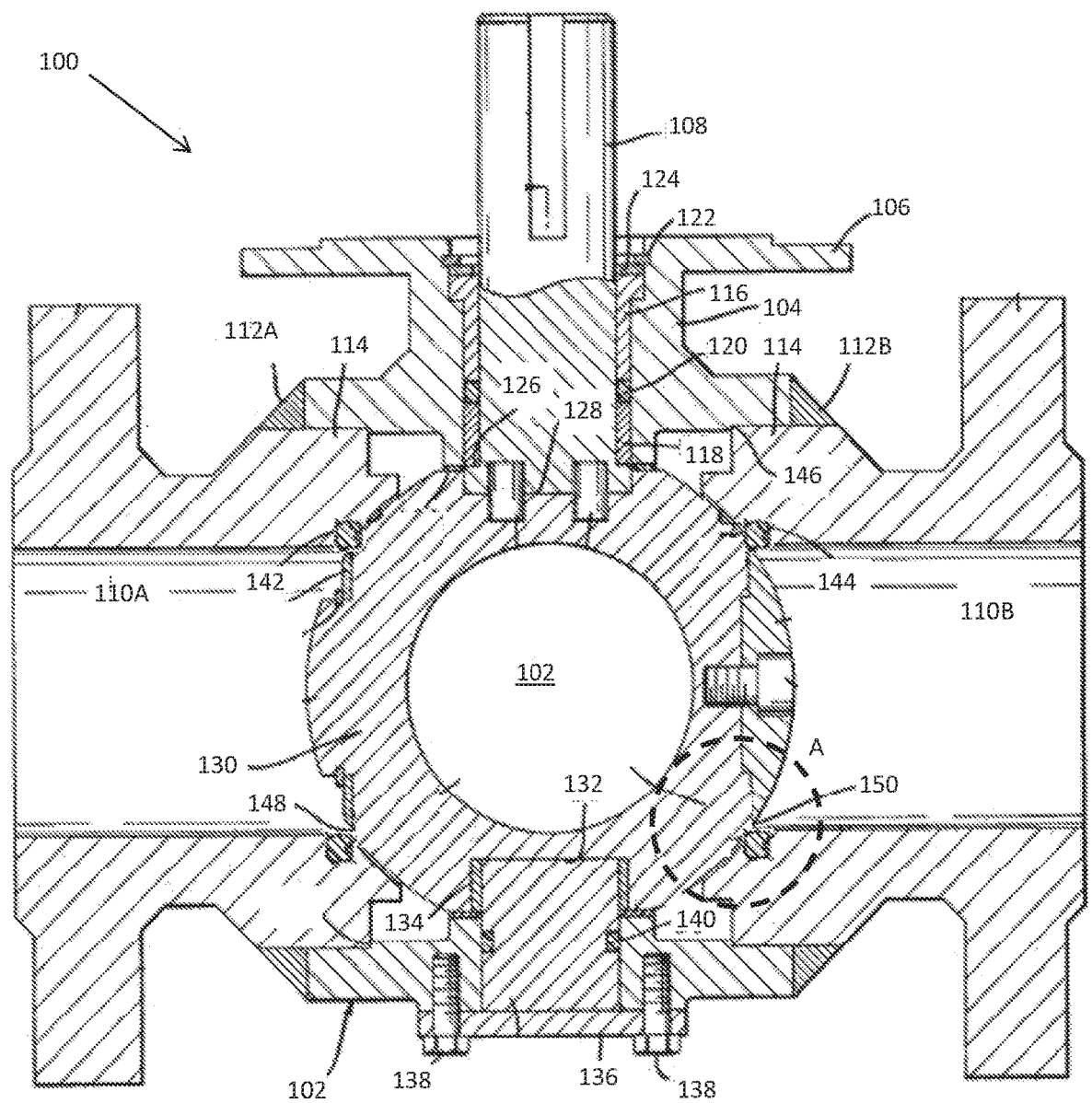
FIG. 1 includes a cross-sectional view of a ball valve in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the seal arts.

A ball valve in accordance with an embodiment can include a seal forming a double piston effect seal in cryogenic conditions. In a particular embodiment, the seal can form a double piston effect seal at both an upstream seat position and a downstream seat position. The ball valve can include a trunnion mounted ball valve, a floating ball valve, or a rising stem ball valve. While the ball valve can be two-way, three-way, four-way, or more-way depending on the use, description herein is made with respect to a two-way ball valve for simplicity.

In an embodiment, the ball valve can include an upstream seat seal, a downstream seat seal, or a combination thereof. In a particular embodiment, the upstream seat seal and downstream seat seal can be symmetrical, such as reflectively symmetrical, translationally symmetrical, or rotationally symmetrical. In a more particular embodiment, the upstream seat seal and downstream seat seal can be identical. In an embodiment, the ball valve can further include a rotatable bore that can be moved a quarter turn to selectively close the ball valve and restrict fluid movement.

In an embodiment, the seal (either or both the upstream and downstream seal(s)) can include a resilient ring defining an engagement feature and a first polymer ring disposed adjacent to a first axial end of the resilient ring and coupled with the engagement feature. A second polymer ring can be disposed adjacent to a second axial end of the resilient ring and couple with the engagement feature. In a particular embodiment, the first and second polymer rings can be coupled with the same engagement feature.

The engagement feature can be adapted to selectively couple with the first and second polymer rings. In an embodiment, the engagement feature includes at least one of a notch, a ridge, a cutout, a castellation, a tine, or any combination thereof. In an embodiment, the engagement feature can be disposed along an outer diameter of the resilient ring. In an embodiment, the engagement feature defines a first axial end and a second axial end. The first polymer ring can be coupled with the resilient ring adjacent to the first axial end and the second polymer ring can be coupled with the resilient ring adjacent to the second axial end. In an embodiment, the first polymer ring contacts the second polymer ring. In a more particular embodiment, the first polymer ring can contact the second polymer ring at an axial location corresponding with the engagement feature.

In an embodiment, the first polymer ring can include a first corresponding engagement feature adapted to engage with the engagement feature of the resilient ring. In another embodiment, the second polymer ring can include a second corresponding engagement feature adapted to engage with the engagement feature of the resilient ring. In an embodiment, the first corresponding engagement feature includes a barb adapted to engage with the engagement feature of the resilient ring. In another embodiment, the second corresponding engagement feature includes a barb adapted to engage with the engagement feature of the resilient ring.

In an embodiment, the first and second corresponding engagement features can have at least one of a same or generally same cross-sectional shape, a same or generally same cross-sectional area, a same or generally same cross-sectional dimension, or any combination thereof.

The first polymer ring can include a body defining an energized zone coupled with the first corresponding engagement feature. The second polymer ring can also include a body defining an energized zone coupled with the second corresponding engagement feature. In an embodiment, the energized zone of at least one of the first and second polymer rings can include at least two energizing elements, such as at least two springs disposed at least partially within the body of the polymer ring. In another embodiment, the energized zone of at least one of the first and second polymer rings can have a cross-sectional shape forming a capital E.

In an embodiment, the at least two energizing elements can be disposed along a straight line, when viewed in cross section. The at least two energizing elements can include a first element and a second element, such as a first spring and a second spring. The first energizing element can be disposed radially inside of the second energizing element. In an embodiment, the second energizing element has an energizing capacity greater than the energizing capacity of the first energizing element. For example, in an embodiment, the second spring can have a diameter greater than a diameter of the first spring. Moreover, the second spring can have a higher spring constant as compared to the first spring.

In an embodiment, the resilient ring can include an inner diameter, an outer diameter, a first axial end, and a second axial end. An edge between at least one of the first and second axial ends and the outer diameter can include a chamfer. In an embodiment, the chamfer has an angle of at least 5 degrees relative to a central axis of the seal, at least 10 degrees, at least 15 degrees, at least 20 degrees, at least 25 degrees, at least 30 degrees, at least 35 degrees, or at least 40 degrees. In a particular embodiment, the chamfer has an angle of approximately 45 degrees relative to a central axis of the seal.

In an embodiment, at least one of the first and second polymer rings includes a thermoplastic. In another embodiment, the first and second polymer rings are part of a same element (i.e., they are part of a single polymer element).

Referring to FIG. 1 a ball valve 100 can generally include a central bore 102 and a valve stem 104 with an exterior mounting flange 106 for supporting a hydraulic motor or manual interface for rotating the valve stem 108. Flow lines 110A and 110B, with axes coincident with the axis of the central bore 102 are coupled with the ball valve 100 at locations 112A and 112B, respectively. In an embodiment, coupling the flow lines 110A and 110B to the ball valve can make an integral body. The flow tubes 110A and 110B can have flanged portions 114 at their ends for connection with similar attaching flanges on the tubulars in the flow patch in which the ball valve 100 is connected.

In an embodiment, the valve stem 108 is journaled in a gland bushing 116 and bushing 118. A seal 120 can be provided between the gland bushing 116 and bushing 118. The gland bushing 116 can be removably mounted in the valve stem 108 by a snap ring 122 received in an annular groove in the outer end of the valve stem 108. The gland bushing 116 can further abut a washer 124 which bears against the end of the gland bushing 116. The lower end of the bushing 118 can abut a shoulder 126 on the end of the valve stem 108 and the shouldered end of the stem can fit into a socket 128 in the ball 130. In an embodiment, the stem can be keyed to the ball 130 by pins 132 to prevent relative movement between the ball 130 and the stem 108.

Opposite the socket 128 can be a socket 132 in the ball 130 which has a bearing bushing 134 in which a trunnion is journaled. The trunnion can extend through the central bore 102 and a cover plate 136 can be secured by threaded fasteners 138 on the tube over the outer end of the trunnion. A seal 140 can be provided in the trunnion to provide a seal between the trunnion and the opening in the tube in which it fits.

The flange portions 114 can have spherical seating surfaces 142 and 144 which generally conform to the outer surface of the ball 130 and internal shoulders 146 of the central bore 102 abut the flanged portions 114 to leave a slight clearance between the ball and the surfaces 142 and 144. Seats 148 and 150 can be disposed between the ball 130 and surrounding the sockets 128 and 132.

Figure 4:
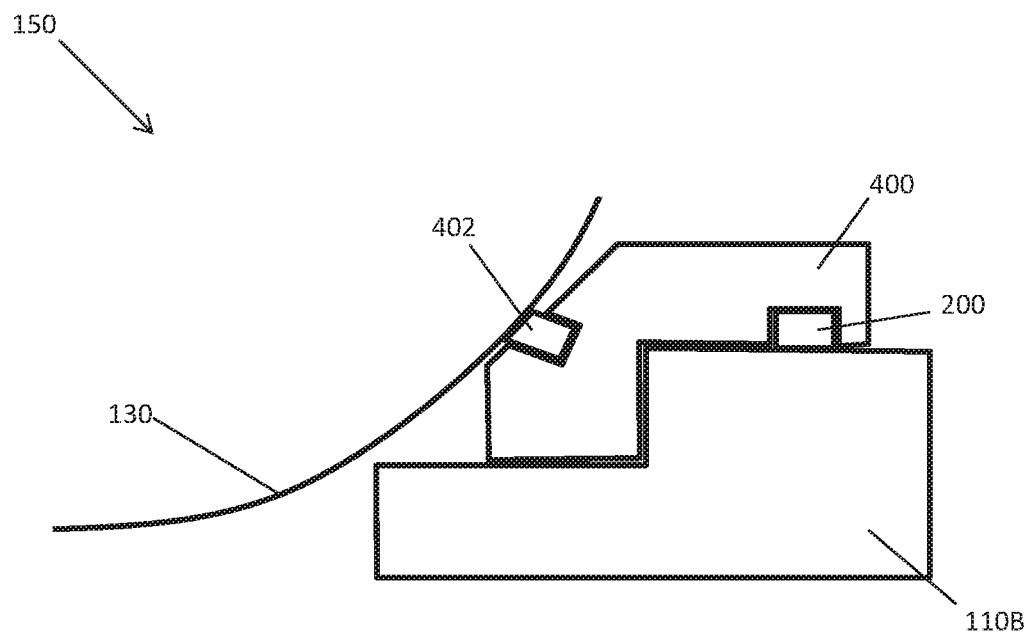
FIG. 4 includes a cross-sectional enlarged view of a ball valve in accordance with an embodiment as seen in Circle A in FIG. 1.

Referring to FIG. 4, at least one of the seats 148 and 150 can include a seat body 400, an insert 402 adapted to contact the ball 130, and a seal 200. In a particular embodiment, the seat body 400 can include a resilient material, such as a metal or an alloy. The insert 402 can extend between the seat body 400 and contact the ball 130. In an embodiment, the insert 402 can include a polymeric material. In another embodiment, the insert 402 can include a metal or an alloy. A biasing element, such as a spring (not illustrated) can bias the seat body 400 relative to the flow tubes 110A and 110B. In an embodiment, the biasing element can bias the seat body 400 in a direction generally toward the ball 130.

Figure 2:
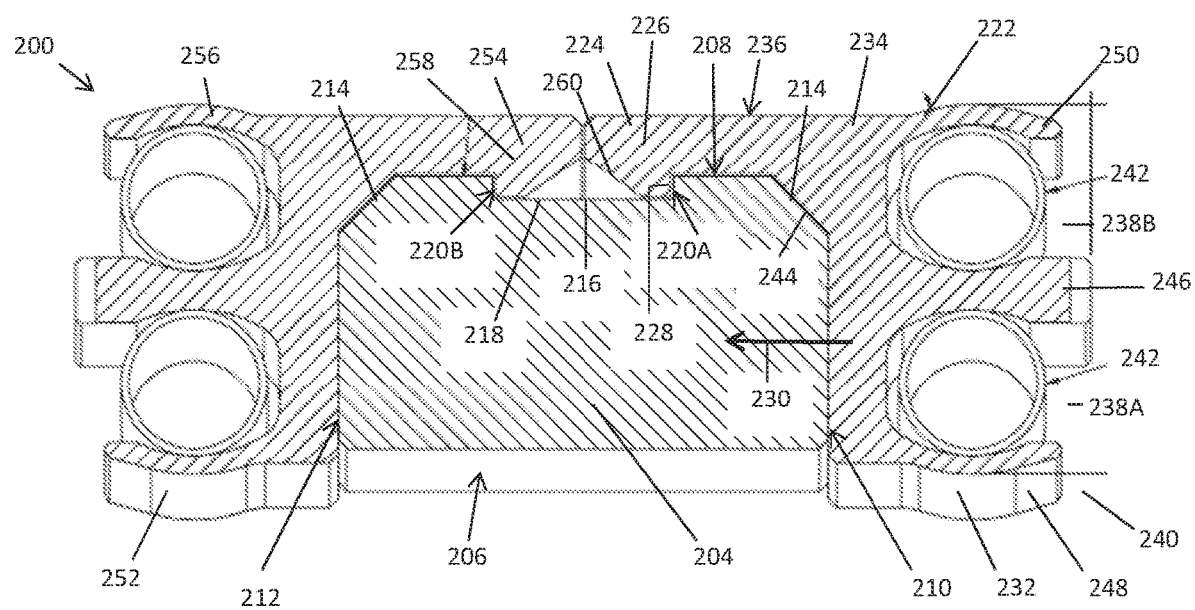
FIG. 2 includes a cross-sectional view of a seal in accordance with an embodiment.

FIG. 2 includes a cross-sectional view of a seal 200 in accordance with an embodiment. While the following description is made with respect to the seal 200, it should be understood that the seal 202 can have any similar or different features as compared with the seal 200. In a particular embodiment, the seal 200 is disposed upstream of the ball 130 and the seal 202 is disposed downstream of the ball 130. In certain instances, the seals 200 and 202 can define rings.

In an embodiment, the seal 200 can be adapted for use in cryogenic temperature applications. More particularly the seal 200 can be adapted for use at temperatures below −150° C., below −175° C., below −200° C., or below −225° C. In certain instances the seal 200 can be a double piston effect seal. In other instances, the seal 200 can be a single piston effect seal.

The seal 200 can include a resilient ring 204 having a generally annular structure defining a central axis. The resilient ring 204 can be formed from a resilient material, such as a metal, alloy, or resilient polymer. In a particular embodiment, the resilient ring 204 can include steel. In a more particular embodiment, the resilient ring 204 can include 316 ST steel.

The resilient ring 204 can define an inner diameter corresponding with an inner surface 206 of the resilient ring 204, an outer diameter corresponding with an outer surface 208 of the resilient ring 204, a first axial end 210, and a second axial end 212 opposite the first axial end 210.

In an embodiment, the resilient ring 204 can include a chamfered edge 214. In certain instances, the chamfered edge 214 can extend between the outer surface 208 and the first axial end 210. In another instance, the chamfered edge 214 can extend between the outer surface 208 and the second axial end 212. In yet a further instance, the resilient ring 204 can include a chamfered edge 214 between the outer surface 208 and the first axial end 210 and a chamfered edge 214 between the outer surface 208 and the second axial end 212. In an embodiment, the chamfered edge 214 can have an angle of at least 5 degrees as measured relative to a central axis of the seal 200. In a more particular embodiment, the chamfered edge 214 can have an angle of at least 10 degrees, at least 15 degrees, at least 20 degrees, at least 25 degrees, at least 30 degrees, at least 35 degrees, or at least 40 degrees. In a particular embodiment, the chamfered edge 214 can have an angle of approximately 45 degrees as measured relative to the central axis of the seal 200.

In an embodiment, the resilient ring 204 can define an engagement feature 216. In a particular embodiment, the engagement feature 216 can be disposed along a surface of the resilient ring 204. More particularly, the engagement feature 216 can be disposed along the outer surface 208 of the resilient ring 204. In the illustrated embodiment, the engagement feature 216 is shown in an axially-centered position, equidistance from the first and second axial ends 210 and 212. In another embodiment, the engagement feature 216 can be disposed closer to one of the first and second axial ends 210 or 212 as compared to the other of the first and second axial ends 210 or 212.

In an embodiment, the engagement feature 216 can include one or more notches extending from the outer surface 208 of the resilient ring 204. In a more particular embodiment, the engagement feature 216 can include a castellated feature(s) extending from the outer surface 208 of the resilient ring 204. In another embodiment, the engagement feature 216 can include a ridge extending around a circumference of the resilient ring 204. The notch(es) or ridge can extend continuously or discontinuously around the resilient ring 204. In yet a further embodiment, the engagement feature 216 can include a cutout 218. In a particular instance, the cutout 218 can extend from the outer surface 208 into the resilient ring 204.

The engagement feature 216 can define a first axial end 220 and a second axial end 222. In certain instances, the first and second axial ends 220A and 220B can be parallel, or generally parallel with respect to one another. In other instances, the first and second axial ends 220A and 220B can be angularly offset from one another. For example, the first and second axial ends 220A and 220B can define negatively-sloped surfaces relative to the outer surface 208 of the resilient ring 204, thus creating a cutout 218 with an increasing dimension as measured from the outer surface 208 into the body of the resilient ring 204. The first and second axial ends 220A and 220B can be spaced apart by a distance corresponding generally with a distance required to secure one or more polymer rings (described in greater detail below) with the resilient ring 204.

In certain instances, the engagement feature 216 can have a generally same shape as measured around the circumference of the resilient ring 204. In other instances, the engagement feature 216 can have a generally same size as measured around the circumference of the resilient ring 204. In yet other instances, the engagement feature 216 can have a generally same shape and a generally same size as measured around the circumference of the resilient ring 204.

The seal 200 can include a first polymer ring 222 coupled with the resilient ring 204. The first polymer ring 222 can be disposed adjacent to the first axial end 212 of the resilient ring 204. In an embodiment, the first polymer ring 222 can contact the first axial end 212 of the resilient ring 204. In a relaxed state (i.e., when the seal 200 is not yet installed in the ball valve 100), the first polymer ring 222 can have a diameter, as measured between an innermost location and an outermost location of the first polymer ring 222, that is greater than the diameter of the resilient ring 204.

In an embodiment, the first polymer ring 222 can be coupled with the engagement feature 216 of the resilient ring 204. In a more particular embodiment, the first polymer ring 222 can include a first complementary engagement feature 224 adapted to engage with the engagement feature 216 of the resilient ring 204. For example, the first polymer ring 222 can be coupled with the resilient ring 204 at a location adjacent to the first axial end 220 of the engagement feature 216. More particularly, the first polymer ring 222 can be engaged with the first axial end 220.

In an embodiment, the first complementary engagement feature 224 can include a barb 226. The barb 226 can have a surface 228 adapted to couple with the first axial end 220 of the engagement feature 216. In an embodiment, the surface 228 of the barb 226 can have a profile similar or the same as the surface of the first axial end 220 of the engagement feature 216. In a particular embodiment, the surface of the first axial end 220 of the engagement feature 216 lies along a best fit plane generally perpendicular to the central axis of the seal 200. In a more particular embodiment, the surface of the first axial end 220 lies along a plane perpendicular to the central axis of the seal 200. The surface 228 of the barb 226 can be adapted to lie parallel with the surface of the first axial end 220.

To assemble the seal 200, the first polymer ring 222 and resilient ring 204 can be axially moved, such as translated, relative to one another. For example, the first polymer ring 222 can be axially slid relative to the resilient ring 204 in a first direction 230 until the first complementary engagement feature 224 engages the engagement feature 216.

Upon contacting the resilient ring 204, the first complementary engagement feature 224 of the first polymer ring 222 can deform, such as flex. In an embodiment, deformation can occur in a radially outward direction. Chamfered edge 214 can assist in installation of the first polymer ring 222 relative to the resilient ring 204. More specifically, the first complementary engagement feature 224 can have a profile adapted to be guided by the chamfered edge 214. Even more specifically, the first complementary engagement feature 224 can have a chamfered edge 260 adapted to contact the chamfered edge 214 of the resilient ring 204 during installation. In a particular instance, the chamfered edges 214 and 260 can lie along same, or generally same, planes. The chamfered edges 214 and 260 can permit guiding of the first polymer ring 222 with respect to the resilient ring 204.

The first polymer ring 222 can be slid in the first direction 230 until the first complementary engagement feature 224 (or barb 226) arrives at the engagement feature 216. Upon arriving at the engagement feature 216, the first complementary engagement feature 224 can deform, such as flex, to engage with the engagement feature 216. In an embodiment, deformation, or flexure, of the first complementary engagement feature 224 upon arriving at the engagement feature 216 can occur in a radially inward direction. In a particular instance, inward deformation of the first complementary engagement feature 224 can occur as a snap of the first complementary engagement feature 224. In an embodiment, the snap can result in a tactile, audible, or otherwise perceptible indication to the operator performing the assembly. In such a manner, the first polymer ring 222 can be coupled with the resilient ring 204 and prevent from axially separating therefrom.

In an embodiment, the first polymer ring 222 can include an energized zone 232. In a more particular embodiment, the energized zone 232 can be part of a same body 234 as the first complementary engagement feature 224. In certain instances, the energized zone 232 and first complementary engagement feature 224 can be integral with one another, such as formed from a single monolithic body. In other instances, the energized zone 232 can be formed from a first component and the first complementary engagement feature 224 can be formed from a second component coupled with the first component.

In the illustrated embodiment, the energized zone 232 defines a diameter, as measured between an innermost location and an outermost location of the energized zone 232, greater than a diameter of the first complementary engagement feature 224. For example, by way of a non-limiting embodiment, the diameter of the energized zone 232 can be at least 1.01 times greater than the diameter of the first complementary engagement feature 224. More particularly, the diameter of the energized zone 232 can be at least 1.1 times greater than the diameter of the first complementary engagement feature 224, at least 1.5 times greater, at least 2.0 times greater, at least 2.5 times greater, at least 3.0 times greater, or at least 3.5 times greater. In another embodiment, the diameter of the energized zone 232 can be no greater than 50.0 times greater than the diameter of the first complementary engagement feature 224, or no greater than 10.0 times greater than the diameter of the first complementary engagement feature 224.

In an embodiment, the first complementary engagement feature 224 can extend from an outer portion of the energized zone 232. In the illustrated embodiment, an outer surface 236 of the body 234 of the first polymer ring 222 can formed by a combination of the energized zone 232 and first complementary engagement feature 224. In a particular embodiment, the surface 236 can be continuous. That is, the surface 236 can appear featureless, smooth, or otherwise non-indicative of a transition in the cross-sectional shape of the body 234 to an observer viewing the seal 200 after assembly.

In a particular embodiment, the energized zone 232 can have a cross-sectional shape forming a capital E. Members, such as middle member 246, of the energized zone can extend toward the axial end 240 of the first polymer ring 222. In an embodiment, the middle member 246 is longer than inner member 248 and outer member 250.

The energized zone 232 can define one or more cavities 238A and 238B. In an embodiment, the cavities 238A and 238B can be disposed adjacent to a first axial end 240 of the first polymer ring 222.

In certain embodiments, the first polymer ring 222 can include a transition zone 244 disposed between the energized zone 232 and the first complementary engagement feature 226. In a particular embodiment, the transition zone 244 can have a tapering cross-sectional shape. In a more particular embodiment, the transition zone 244 can have a chamfered edge adapted to seat relative to the chamfered edge 214 of the resilient ring 204 when the first polymer ring 222 is engaged therewith.

At least one energizing element 242 can be disposed within or adjacent to the first polymer ring 222. In an embodiment, the at least one energizing element 242 can include at least two energizing elements, at least three energizing elements, at least four energizing elements, or at least five energizing elements. In an embodiment, the at least one energizing element 242 can include no greater than fifty energizing elements, no greater than twenty-five energizing elements, no greater than ten energizing elements, or no greater than six energizing elements.

In a particular instance, the at least one energizing element 242 includes a first energizing element and a second energizing element. The first energizing element can be disposed at least partially radially inside of the second energizing element. In a particular embodiment, the first and second energizing elements can lie along a straight line extending perpendicular to the central axis of the first polymer ring 222.

In an embodiment, the at least one energizing element 242 can include a spring. The spring can include, for example, a spring having a round cross-sectional shape such as a helical spring, a double coiled spring, a U-shaped spring, a C-shaped spring, a V-shaped spring, or any other shaped spring adapted to provide a radially outward biasing force. In certain instances, the first and second energizing elements can have a same, or generally same, shape, spring constant, size, or other similar characteristic as compared to one another. In other instances, the first and second energizing elements can have different shapes, different spring constants, different sizes, or one or more other different characteristics as compared to one another. In a particular embodiment, the first and second energizing elements have different energizing capacities (e.g., different spring constants). More particularly, the second energizing element, disposed radially outside of the first energizing element, can have a greater energizing capacity as compared to the energizing capacity of the first energizing element. In a particular instance, use of an outer energizing element with a greater energizing capacity can enhance sealing characteristic of the seal 200 as compared to a seal with an inner-energizing element with a greater energizing capacity.

Figure 3:
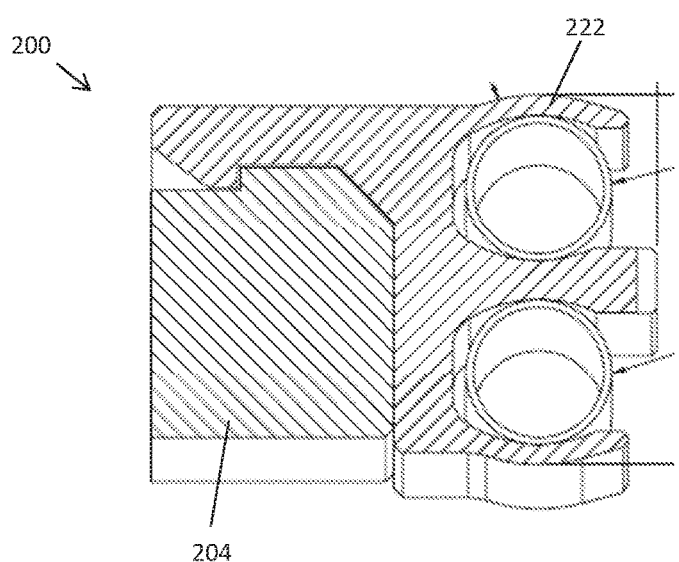
FIG. 3 includes a cross-sectional view of a seal in accordance with another embodiment.

As illustrated in FIG. 3, in an embodiment, the seal 200 can include the resilient ring 204 and the first polymer ring 222 coupled together. In an embodiment, the resilient ring 204 can include half, or generally half, of the resilient ring 204 described with respect to FIG. 2. In another embodiment, the resilient ring 204 can include a shape similar to that described with respect to FIG. 2.

Referring again to FIG. 2, in an embodiment, the seal 200 can further include a second polymer ring 252. The second polymer ring 252 can include any number of similar or different features as compared to the first polymer ring 222. In an embodiment, the first and second polymer rings 222 and 252 are symmetrical. In a more particular embodiment, the first and second polymer rings 222 and 252 reflectively symmetrical.

The second polymer ring 252 can be disposed adjacent to the resilient ring 204. More particularly, the second polymer ring 252 can be disposed adjacent to the second axial end 212 of the resilient ring 204.

In an embodiment, the second polymer ring 252 can include a second complementary engagement feature 254 coupled with an energized zone 256. The second complementary engagement feature 254 can be adapted to couple with the resilient ring 204. More particularly, the second complementary engagement feature 254 can be adapted to couple with the engagement feature 216 of the resilient ring 204. Even more particularly, in an embodiment, the second complementary engagement feature 254 can include a barb 258 adapted to couple with the second axial end 222 of the engagement feature 216.

To assemble the seal 200, the second polymer ring 252 and resilient ring 204 can be axially moved, such as translated, relative to one another. For example, the second polymer ring 252 can be axially slid relative to the resilient ring 204 in a second direction (opposite or generally opposite the first direction 230) until the second complementary engagement feature 254 engages the engagement feature 216.

Upon contacting the resilient ring 204, the second complementary engagement feature 254 of the second polymer ring 252 can deform, such as flex. In an embodiment, deformation can occur in a radially outward direction. Chamfered edge 214 can assist in installation of the second polymer ring 252 relative to the resilient ring 204. More specifically, the second complementary engagement feature 254 can have a profile adapted to be guided by the chamfered edge 214. Even more specifically, the second complementary engagement feature 254 can have a chamfered edge adapted to contact the chamfered edge 214 of the resilient ring 204 during installation. In a particular instance, the chamfered edge of the second complementary feature 254 can lie along same, or generally same, plane as the chamfered edge 214 of the resilient ring 204. The chamfered edges can permit guiding of the second polymer ring 252 with respect to the resilient ring 204.

The second polymer ring 252 can be slid in the second direction until the second complementary engagement feature 254 arrives at the engagement feature 216. Upon arriving at the engagement feature 216, the second complementary engagement feature 254 can deform, such as flex, to engage with the engagement feature 216. In an embodiment, deformation, or flexure, of the second complementary engagement feature 254 upon arriving at the engagement feature 216 can occur in a radially inward direction. In a particular instance, inward deformation of the second complementary engagement feature 254 can occur as a snap of the second complementary engagement feature 254. In an embodiment, the snap can result in a tactile, audible, or otherwise perceptible indication to the operator performing the assembly. In such a manner, the second polymer ring 252 can be coupled with the resilient ring 204 and prevent the second polymer ring 252 and resilient ring 204 from axially separating.

In certain instances, the first and second polymer rings 222 and 252 can contact one another when coupled with the resilient ring 204. In an embodiment, the first complementary engagement feature 224 can contact the second complementary engagement feature 254. In a more particular embodiment, the first complementary engagement feature 224 can contact the second complementary engagement feature 254 at a location corresponding in an axial direction with the engagement feature 216. That is, for example, contact between the first and second complementary engagement features 224 and 254 can occur along a plane perpendicular to the central axis of the seal 200 and intersecting the engagement feature 216 of the resilient ring 204. In a particular embodiment, the first and second complementary engagement features 224 and 254 can contact one another a location equally, or generally equally, spaced apart from the axial ends 220 and 222 of the complementary engagement feature 216.

In an embodiment, the first and second complementary engagement features 222 and 254 can have at least one of a generally same cross-sectional shape, a generally same cross-sectional area, a generally same cross-sectional dimension, or any combination thereof. In a more particular embodiment, the first and second complementary engagement features 222 and 254 can have at least one of a same cross-sectional shape, a same cross-sectional area, a same cross-sectional dimension, or any combination thereof.

In certain instances, at least one of the first and second polymer rings 222 and 252 can include a thermoplastic material. In an embodiment, at least one of the first and second polymer rings 222 and 252 can include a nylon, a polyether ether ketone (PEEK), polyether sulfone (PES), polytetrafluoroethylene (PTFE), polyimide, or an organic or inorganic composite. Further exemplary polymers include fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyethylene (PE), polysulfone, polyamide (PA), polyphenylene oxide, polyphenylene sulfide (PPS), polyurethane, polyester, liquid crystal polymers (LCP), or any combination thereof.

In an embodiment, at least one of the first and second polymer rings 222 and 254, can include a filler. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In an embodiment, the first and second polymer rings 222 and 254 can be parts of a single polymer element. That is, for example, the first and second polymer rings 222 and 254 can be integral with one another. More specifically, the first and second polymer rings 222 and 254 can be formed from, or include, a single body.

Embodiment 1

A seal for a ball valve comprising:
a resilient ring defining an engagement feature;
a first polymer ring disposed adjacent to a first axial end of the resilient ring and coupled with the engagement feature; and
a second polymer ring disposed adjacent to a second axial end of the resilient ring and coupled with the engagement feature.

Embodiment 2

The seal of embodiment 1, wherein the engagement feature comprises a notch, a ridge, a cutout, a castellation, or any combination thereof.

Embodiment 3

The seal of any one of the preceding embodiments, wherein the engagement feature is disposed along an outer diameter of the resilient ring.

Embodiment 4

The seal of any one of the preceding embodiments, wherein the engagement feature defines a first axial end and a second axial end, wherein the first polymer ring is coupled with the resilient ring adjacent to the first axial end, and wherein the second polymer ring is coupled with the resilient ring adjacent to the second axial end.

Embodiment 5

The seal of any one of the preceding embodiments, wherein the first polymer ring contacts the second polymer ring.

Embodiment 6

The seal of any one of the preceding embodiments, wherein the first polymer ring contacts the second polymer ring at an axial location corresponding with the engagement feature.

Embodiment 7

The seal of any one of the preceding embodiments, wherein the first polymer ring comprises a first corresponding engagement feature adapted to engage with the engagement feature of the resilient ring.

Embodiment 8

The seal of embodiment 7, wherein the first corresponding engagement feature comprises a barb adapted to engage with the engagement feature of the resilient ring.

Embodiment 9

The seal of any one of the preceding embodiments, wherein the second polymer ring comprises a second corresponding engagement feature adapted to engage with the engagement feature of the resilient ring.

Embodiment 10

The seal of embodiment 9, wherein the first and second corresponding engagement features have at least one of a generally same cross-sectional shape, a same cross-sectional area, a same cross-sectional dimension, or any combination thereof.

Embodiment 11

The seal of any one of the preceding embodiments, wherein the first polymer ring comprises a body defining a first corresponding engagement feature and an energized zone coupled with the first corresponding engagement feature.

Embodiment 12

The seal of embodiment 11, wherein the energized zone comprises at least one energizing element.

Embodiment 13

The seal of any one of embodiments 11 and 12, wherein the energized zone comprises at least one spring disposed at least partially within the body of the first polymer ring.

Embodiment 14

The seal of embodiment 13, wherein the at least one energizing element comprises at least two springs disposed along a straight line extending perpendicular to a central axis of the first polymer ring.

Embodiment 15

The seal of embodiment 14, wherein the at least two springs include a first spring and a second spring, wherein the first spring is disposed radially inside of the second spring, and wherein the second spring has an energizing capacity greater than an energizing capacity of the first spring.

Embodiment 16

The seal of embodiment 15, wherein the second spring has a diameter greater than a diameter of the first spring.

Embodiment 17

The seal of any one of embodiments 14-16, wherein at least one of the at least two springs comprises a double coiled spring.

Embodiment 18

The seal of any one of the preceding embodiments, wherein the seal is adapted to operate at cryogenic temperatures.

Embodiment 19

The seal of any one of the preceding embodiments, wherein the seal is adapted to form a double piston effect seal.

Embodiment 20

The seal of any one of the preceding embodiments, wherein the resilient ring comprises an inner diameter, an outer diameter, a first axial end, and a second axial end, and wherein an edge between at least one of the first and second axial ends and the outer diameter comprises a chamfer.

Embodiment 21

The seal of embodiment 20, wherein the chamfer has an angle of at least 5 degrees relative to a central axis of the seal, at least 10 degrees, at least 15 degrees, at least 20 degrees, at least 25 degrees, at least 30 degrees, at least 35 degrees, or at least 40 degrees.

Embodiment 22

The seal of any one of embodiments 20 and 21, wherein the chamfer has an angle of 45 degrees relative to a central axis of the seal.

Embodiment 23

The seal of any one of the preceding embodiments, wherein at least one of the first and second polymer rings comprises a thermoplastic.

Embodiment 24

The seal of any one of the preceding embodiments, wherein the first and second polymer rings are part of a same element.

Embodiment 25

A polymer seal ring comprising:
an energized zone including at least one energizing element; and
an engagement feature adapted to engage with a resilient ring.

Embodiment 26

The polymer seal ring of embodiment 25, wherein the at least one energizing element comprises at least two energizing elements disposed along a same plane, and wherein the engagement feature is coupled with the energized zone and extends perpendicular to the plane.

Embodiment 27

The polymer seal ring of embodiment 26, wherein at least one of the at least two energizing elements comprises a spring.

Embodiment 28

The polymer seal ring of any one of embodiments 25-27, wherein the engagement feature comprises a barb with a lip adapted to engage with the resilient ring.

Embodiment 29

The polymer seal ring of any one of embodiments 25-28, wherein the engagement feature is adapted to flex in a direction perpendicular to the plane

Embodiment 30

The polymer seal ring of any one of embodiments 25-29, wherein the energized zone has a cross-sectional shape forming a capital E.

Embodiment 31

The polymer seal ring of any one of embodiments 25-30, further comprising a transition zone disposed between the energized zone and the engagement feature, wherein the transition zone comprises a chamfered edge.

Embodiment 32

The polymer seal ring of embodiment 31, wherein the chamfered edge has an angle of at least 5 degrees relative to a central axis of the polymer seal ring, at least 10 degrees, at least 15 degrees, at least 20 degrees, at least 25 degrees, at least 30 degrees, at least 35 degrees, or at least 40 degrees.

Embodiment 33

A method of assembling a seal assembly comprising:
axially sliding a first polymer ring relative to a resilient ring in a first direction until an engagement feature of the resilient ring engages a first complementary engagement feature on the first polymer ring.

Embodiment 34

The method of embodiment 33, further comprising:
axially sliding a second polymer ring relative to the resilient ring in a second direction until the engagement feature engages a second complementary engagement feature on the second polymer ring.

Embodiment 35

The method of embodiment 34, wherein the first direction is opposite the second direction.

Embodiment 36

The method of any one of embodiments 34 and 35, wherein axially sliding the second polymer ring is performed such that the second complementary engagement feature flexes radially outward.

Embodiment 37

The method of any one of embodiments 34-36, wherein axially sliding the second polymer ring is performed until a barb of the second complementary engagement feature engages with a lip of the resilient ring.

Embodiment 38

The method of any one of embodiments 33-37, wherein axially sliding the first polymer ring is performed such that the first complementary engagement features flexes radially outward.

Embodiment 39

The method of any one of embodiments 33-38, wherein axially sliding the first polymer ring is performed until a barb of the first complementary engagement feature engages with a surface of the resilient ring.

Embodiment 40

The method of embodiment 39, wherein the surface of the resilient ring is disposed along a plane perpendicular to a central axis of the seal assembly.

Embodiment 41

The method of any one of embodiments 33-40, further comprising installing the seal assembly in a ball valve.

Embodiment 42

The method of any one of embodiments 33-41, further comprising exposing the seal assembly to cryogenic temperatures.

Embodiment 43

The method of any one of embodiments 33-42, further comprising forming a double piston effect seal.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A seal for a ball valve comprising:
a resilient ring defining an engagement feature;
a first polymer ring disposed adjacent to a first axial end of the resilient ring and coupled with the engagement feature; and
a second polymer ring disposed adjacent to a second axial end of the resilient ring and coupled with the engagement feature, wherein the first polymer ring comprises a first corresponding engagement feature adapted to engage with the engagement feature of the resilient ring, and wherein the first corresponding engagement feature comprises a barb adapted to engage with the engagement feature of the resilient ring, wherein the first polymer ring may contact the second polymer ring when coupled with the resilient ring.

2. The seal of claim 1, wherein the engagement feature comprises a notch, a ridge, a cutout, a castellation, or any combination thereof.

3. The seal of claim 1, wherein the engagement feature is disposed along an outer diameter of the resilient ring.

4. The seal of claim 1, wherein the engagement feature defines a first axial end and a second axial end, wherein the first polymer ring is coupled with the resilient ring adjacent to the first axial end, and wherein the second polymer ring is coupled with the resilient ring adjacent to the second axial end.

5. The seal of claim 1, wherein the first polymer ring contacts the second polymer ring at an axial location corresponding with the engagement feature.

6. The seal of claim 1, wherein the second polymer ring comprises a second corresponding engagement feature adapted to engage with the engagement feature of the resilient ring.

7. The seal of claim 1, wherein the first polymer ring comprises a body defining the first corresponding engagement feature and an energized zone coupled with the first corresponding engagement feature.

8. The seal of claim 7, wherein the energized zone comprises at least one energizing element.

9. The seal of claim 7, wherein the energized zone comprises at least one spring disposed at least partially within the body of the first polymer ring.

10. The seal of claim 9, wherein the at least one energizing element comprises at least two springs disposed along a straight line extending perpendicular to a central axis of the first polymer ring.

11. The seal of claim 1, wherein the resilient ring comprises an inner diameter, an outer diameter, a first axial end, and a second axial end, and wherein an edge between at least one of the first and second axial ends and the outer diameter comprises a chamfer.

12. The seal of claim 1, wherein at least one of the first and second polymer rings comprises a thermoplastic.

13. A polymer seal ring comprising:
an energized zone including at least one energizing element; and
an engagement feature adapted to engage with a resilient ring, wherein the engagement feature comprises a barb with a lip adapted to engage with the resilient ring, wherein the at least one energizing element comprises at least two energizing elements disposed along a same plane, and wherein the engagement feature is coupled with the energized zone and extends perpendicular to the plane.

14. The polymer seal ring of claim 13, further comprising a transition zone disposed between the energized zone and the engagement feature, wherein the transition zone comprises a chamfered edge.

15. A method of assembling a seal assembly comprising:
axially sliding a first polymer ring relative to a resilient ring in a first direction until an engagement feature of the resilient ring engages a first complementary engagement feature on the first polymer ring, wherein the first corresponding engagement feature comprises a barb adapted to engage with the engagement feature of the resilient ring, wherein the first polymer ring may contact the second polymer ring when coupled with the resilient ring.

16. The method of claim 15, further comprising:
axially sliding a second polymer ring relative to the resilient ring in a second direction until the engagement feature engages a second complementary engagement feature on the second polymer ring.

* * * * *